United States Patent [19]
Danly

[11] 3,861,322
[45] Jan. 21, 1975

[54] FRICTION DRIVE LOADER

[75] Inventor: James C. Danly, River Forest, Ill.

[73] Assignee: Danly Machine Corporation, Chicago, Ill.

[22] Filed: Sept. 6, 1972

[21] Appl. No.: 286,690

[52] U.S. Cl................ 104/166, 74/199, 104/147 R
[51] Int. Cl.......................................... B61b 13/12
[58] Field of Search........... 104/147 R, 148 R, 166, 104/165, 167; 74/199, 202

[56] References Cited
UNITED STATES PATENTS
3,164,104  1/1965  Hunt................................. 104/166
3,622,691  5/1972  Goirand......................... 104/166 X Primary Examiner—Robert J. Spar
Assistant Examiner—George F. Abraham
Attorney, Agent, or Firm—Wolfe, Hubbard, Leydig, Voit & Osann, Ltd.

[57] ABSTRACT

A loader for loading and unloading a power press or the like which employs a reciprocating carriage embracing a longitudinal rotary drive shaft. Resiliently surfaced idler rollers on the carriage frictionally engage the drive shaft. The idler rollers are mounted in rotatable collars for skewing them in one direction or the other with respect to a neutral position for propelling the carriage in opposite directions. To rotate the collars a linkage is used driven by a cam follower which engages a cam track arranged adjacent the path of movement of the carriage. The cam track has forward and return portions consisting of parallel and convergent sections so as to form a closed loop, with means for varying the length of the parallel sections for the purpose of varying the stroke of the carriage. Power actuators at each end of the loop shift the cam follower between the forward and return portions of the cam track. Mounted upon the carriage is an arm having means for gripping and releasing a work piece in synchronism with the movement of the carriage. It is one of the features that the carriage is automatically positioned at each end of the stroke by servo action, thus avoiding banging against fixed stops.

13 Claims, 16 Drawing Figures

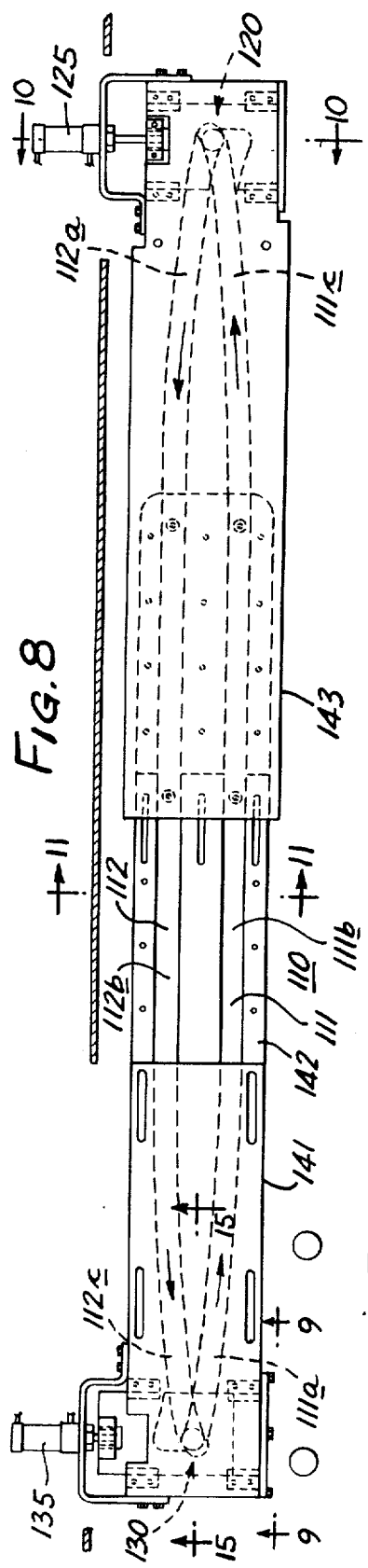
Fig. 8
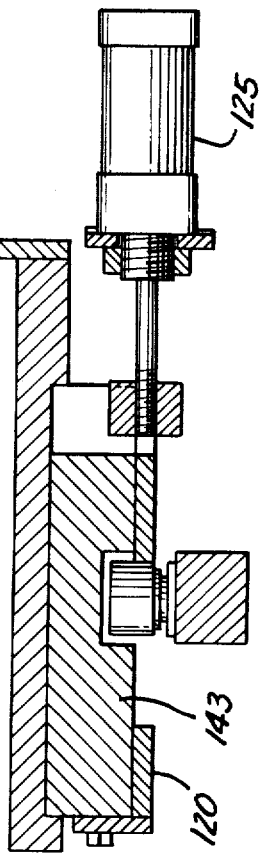
Fig. 10
Fig. 12
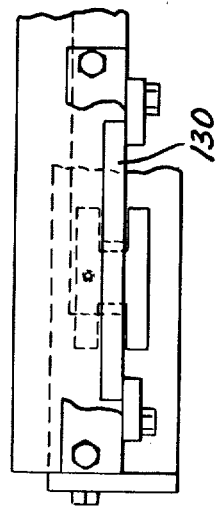
Fig. 9
Fig. 11

FRICTION DRIVE LOADER

It is an object of the present invention to provide a loader which is inherently durable for use on a continuous basis for heavy duty work, which may be fitted to new presses or presses in the field with only minor modification, which may be constructed at low cost, and which is capable of operating for long periods without maintance or adjustment.

It is another object of the present invention to provide a loader for a power press which is highly versatile and in which such factors as length of stroke, acceleration, deceleration and speed in both the forward and return directions may be optimized for easily and quickly adapting the loader to a wide variety of conditions.

It is still another object of the present invention to provide a loader which is capable of generating the forces required to handle heavy work pieces but which is nevertheless impositively driven so as to provide a safety factor in the event of accidental obstruction of the loader carriage or arm during the course or reciprocating movement.

Other features and advantages of the invention will come apparent upon reading the attached detailed description and upon reference to the drawings in which:

FIG. 8 is a plan view of the cam track assembly looking along line 8—8 in FIG. 1.

FIG. 9 is a fragmentary elevation of the left-hand end of the cam track assembly looking along line 9—9 in FIG. 8.

FIG. 10 is a horizontal cross section taken through the right-hand end of the cam track assembly along line 10-10 in FIG. 8.

FIG. 11 is a cross sectional view looking along line 11—11 in FIG. 8.

FIG. 12 is a fragmentary profile view of the right-hand end of the cam track of FIG. 8 as viewed from the underside.

FIG. 16 is a diagram showing the compound path of the gripper.

While the invention has been described in connection with a preferred embodiment, it will be understood that I do not intend to be limited to the particular embodiment shown but intend, on the contrary, to cover the various alternative and equivalent constructions included within the spirit and scope of the appended claims.

Figure 1:
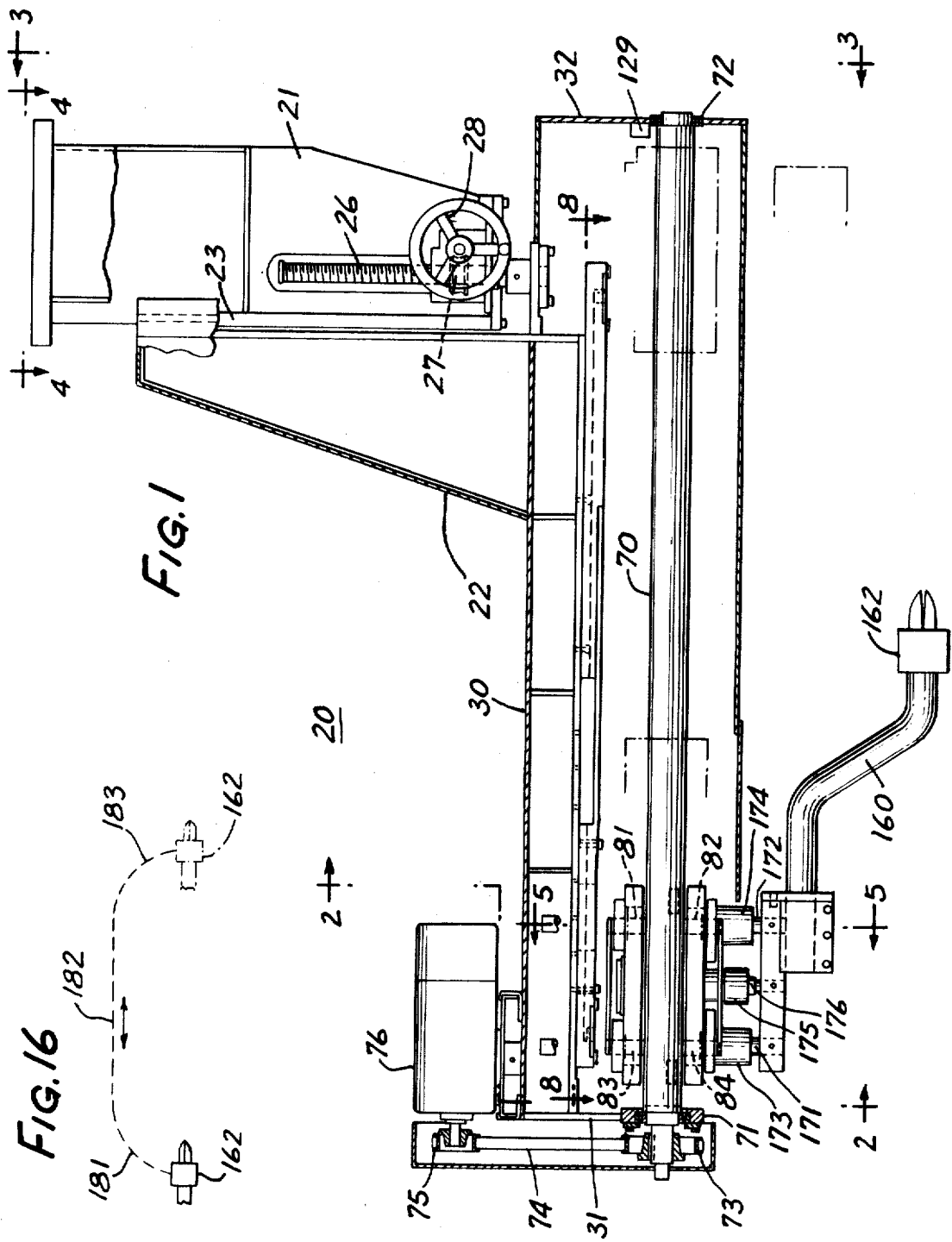
FIG. 1 is an elevational view of a loader constructed in accordance with the present invention and with certain parts in cross section to reveal details of construction.
Figure 2:
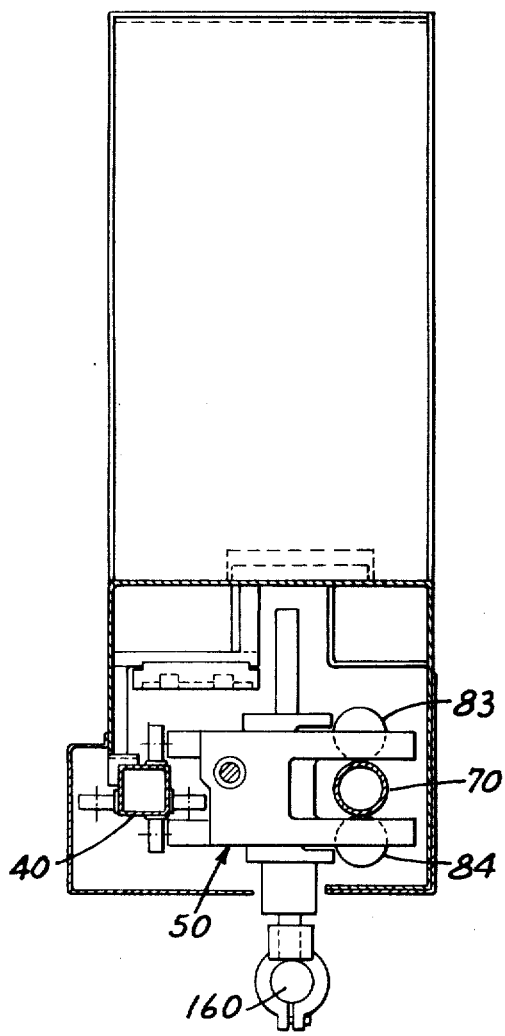
FIG. 2 is a vertical section taken along line 2—2 in FIG. 1.
Figure 3:
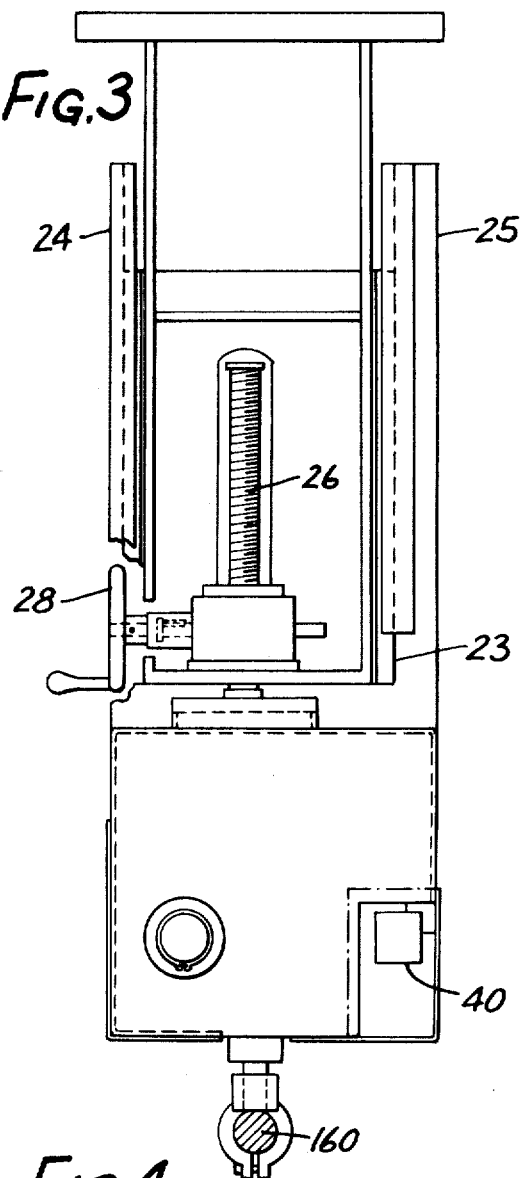
FIG. 3 is an end elevation linking along line 3—3 in FIG. 1, again with certain parts broken away.
Figure 4:
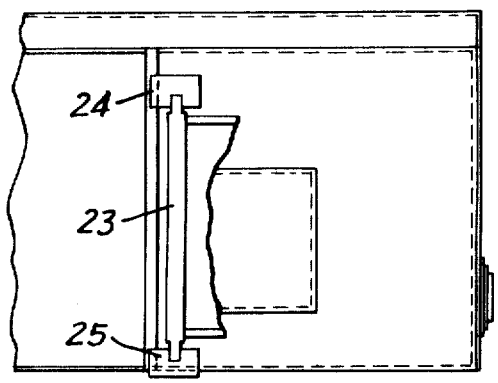
FIG. 4 is a fragmentary top view looking along line 4—4 in FIG. 1.

Turning now to the drawings, particularly FIG. 1, there is shown a loader 20 constructed in accordance with the present invention having a bracket or base 21 which is suitably supported (by means not shown) on the press structure. Extending cantilever-fashion on the bracket 21 is a horizontally extending frame 22. To adjust the vertical position of the frame 22 the bracket 21 has a vertical way member in the form of a plate 23, the edges of which are captive in cooperating vertical way members 24, 25 on the frame. Vertical adjustment of the frame 22 relative to the bracket is obtained by a jack screw 26 which is engaged by a captive nut 27 which is rotated by a hand wheel 28.

As is apparent in FIGS. 1–4, the frame 22 provides a housing of rectangular shape having a top wall 30, a first end wall 31, and a second end wall 32. Mounted within the housing, and forming a part of the frame, is a horizontal way bar 40 which is preferably of square cross section and which is engaged by pairs of horizontally spaced rollers 41, 42 and 43, 44, as well as a pair of vertically spaced rollers 45, 46. Supported upon the rollers for longitudinal movement along the way bar is a carriage 50 of composite construction having end members 51, 52 and a central casting 53 sandwiched between them and secured by machine screws 54 (FIGS. 5 and 6).

The central casting 53 is of C-shaped cross section having a horizontal opening 60 between upper and lower horizontal extensions 61, 62.

In accordance with the present invention a drive shaft is provided which is embraced by the carriage 50 and which is engaged by resiliently surfaced idler rollers journaled in the carriage for rotation about axes lying in planes substantially parallel to the axis of the drive shaft. Means are provided for mounting the roller shafts in the carriage for skewing movement, the rollers being skewed simultaneously in one direction or the other from a neutral position for propelling the carriage in one direction or the other along the drive shaft. More specifically in accordance with the invention, each of the rollers is mounted in a rotatable, or rockable, collar which lies in a plane which is parallel to the axis of the drive shaft and with the collars all being simultaneously rocked in accordance with a desired program of speed and direction for reciprocation of the carriage back and forth to carry out the loading function.

Figure 5:
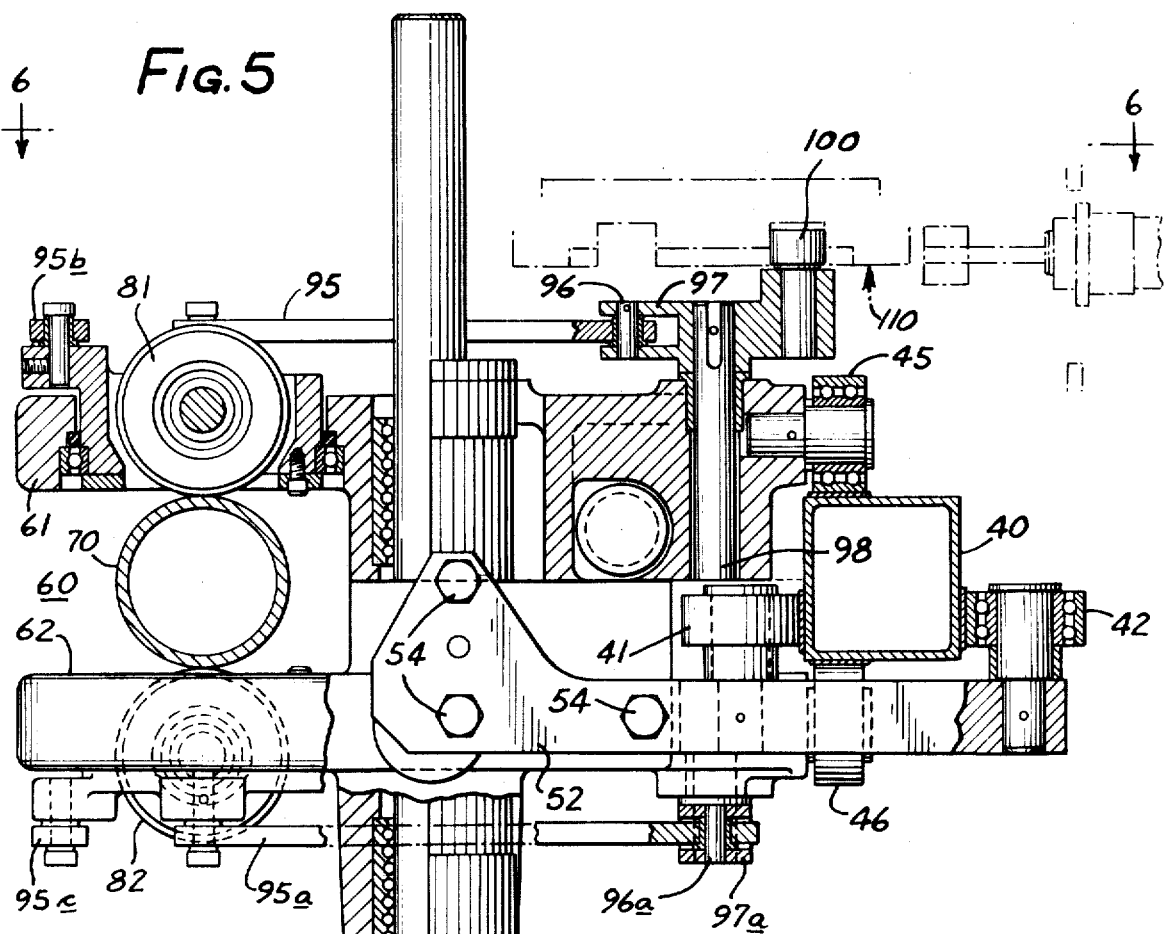
FIG. 5 is an enlarged fragmentary section taken along line 5—5 in FIG. 1.
Figure 6:
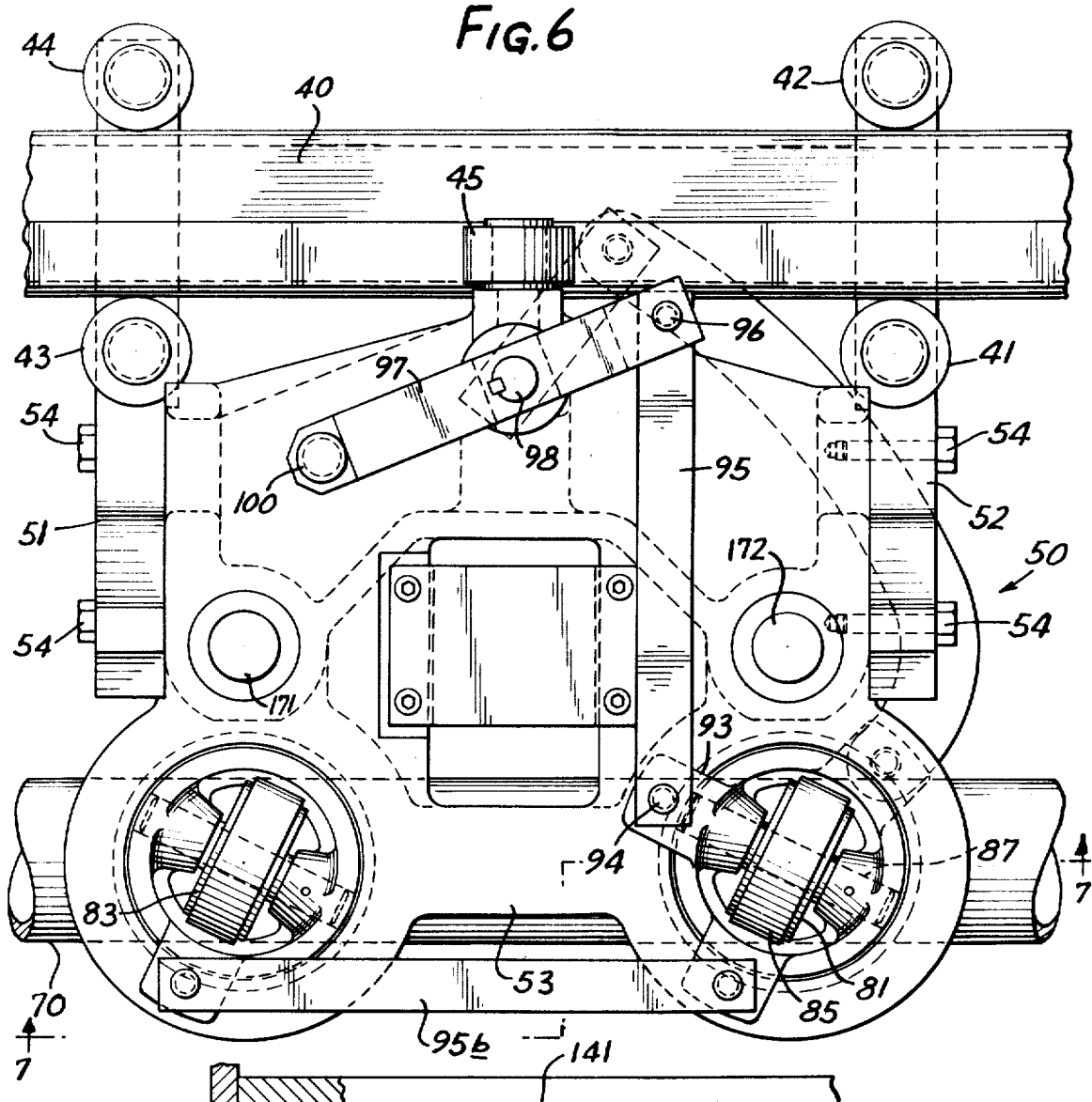
FIG. 6 is a fragmentary top view of the carriage looking along line 6—6 in FIG. 5.

Thus, referring to FIGS. 1, 5, and 6 of the drawings a drive shaft 70 extends from one end of the frame 22 to the other, being journaled in bearings 71, 72 at its respective ends. Secured to the left-hand end of the shaft is a pulley 73 driven by a belt 74 which is, in turn, driven by a drive pulley 75 on an electric motor 76. In a practical case, the drive shaft 70 may be rotated at a relatively low speed, a speed which may be in the general neighborhood of 600–900 rpm.

Figure 7:
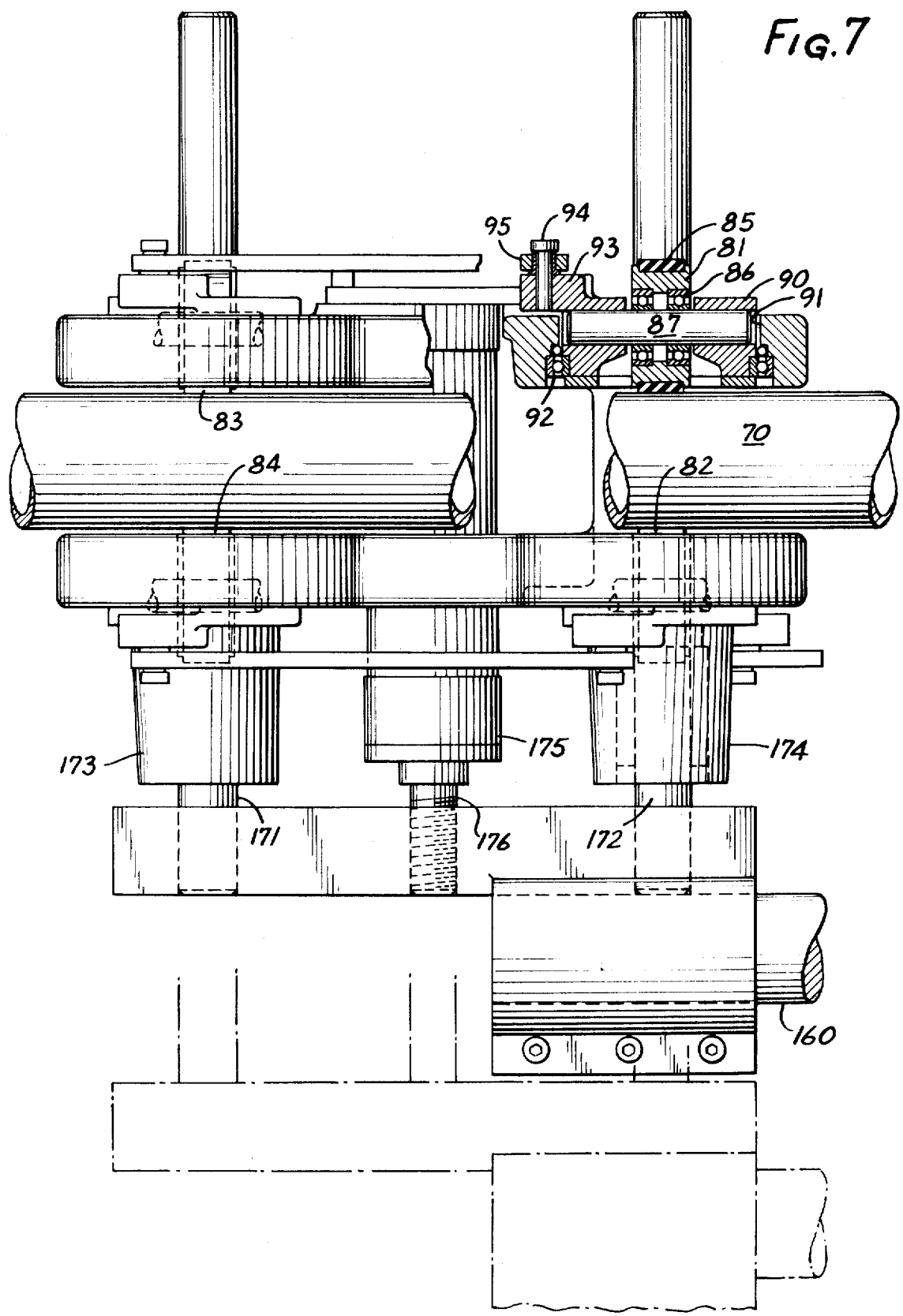
FIG. 7 is a fragmentary elevation of the carriage looking along line 7—7 in FIG. 6.

Engaging the upper and lower surfaces of the drive shaft 70 is a first pair of resiliently surfaced idler rollers 81, 82. Longitudinally spaced therefrom is a second pair of idler rollers 83, 84. Taking the idler roller 81, shown in FIGS. 6 and 7, by way of example, it has a resilient "tire" 85 which may for example be formed of durable plastic material such as nylon. The roller is mounted by means of anti-friction bearings 86, upon a roller shaft 87 which is oriented in a plane which is parallel to the axis of the drive shaft 70. For the purpose of adjustably skewing the roller shaft 87 and the roller which is mounted upon it, the shaft 87 is mounted in a rotatable collar 90 which occupies an opening 91 bored in the central portion 53 of the carriage, being rotationally supported therein upon an anti-friction bearing 92. The collar 90 has an integral crank 93 mounting a pin 94 to which is attached a link 95, the link, in turn, being pinned at 96 to a lever 97 having a shaft 98 which is journaled in vertical position in the carriage. Each of the rollers 82–84 has a similar mounting collar, and corresponding reference numerals, with addition of subscripts a, b, and c, respectively, are employed to designate corresponding parts. When the roller axes are parallel to the axis of the drive shaft, this defines a neutral condition in which the rollers rotate without movement of the carriage. Conveniently, the two "upper" collars are directly connected by a link 95b.

For rotating the lower collars the shaft 98 has an arm 97a at its lower end which is connected, via a "boomerang"-shaped link 95a to collar 82 which is in turn coupled to collar 84 by a link 95c (FIGS. 5 and 6). Note that the link 95a which skewingly positions the lower rollers lies on the oppostie side of the collar axis from the link 95. Consequently, the lower rollers are skewed, with respect to the carriage, equally in opposite directions for propelling the carriage in a given direction. It will be apparent, then, that when the shaft 98 is rocked, the links 95, 95a are displaced in opposite directions to cause equal skewing of rollers 81, 83 and 82, 84 in opposite directions, but with all of the rollers skewed in the same direction with respect to the drive shaft axis and thus cooperating in producing movement of the carriage. In one condition of skew, the idler rollers, because of their frictional engagement, all tend to "walk" along helical paths having equal pitch to advance the carriage in one direction. Conversely, when the rollers are skewed in respectively opposite directions from the neutral condition, the carriage is propelled in the opposite or return direction.

Figures 13, 14:
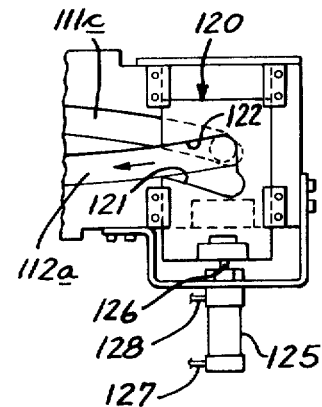
FIG. 13 shows the power actuated switch plate at the right-hand end of the cam track assembly in "receiving" position, viewed from the underside.
FIG. 14 shows the power actuated switch plate in "sending" position.

In accordance with one of the aspects of the present invention, a stationary cam track is provided adjacent the path of movement of the carriage for engaging a cam follower which forms the input element of the control linkage 95, 97, thereby to predetermine the direction and amount of skewing which is effective along each point in the path of forward and return movement of the carriage. Thus, I provide a cam follower 100 on the lever 97 which engages a cam track assembly 110 which has a first or "forward" cam track 111 and a second or return cam track 112. The "forward" cam track 111 (FIG. 8) has an initial or accelerating portion 111a, a straight parallel portion 111b, and a decelerating portion 111c. On the return stroke, the cam follower engages an accelerating portion 112a, a straight, parallel portion 112b and a final curved decelerating portion 112c. Such portions, taken together, provide a closed loop to define up a complete cycle of cam follower movement. In order to switch the cam follower from the forward portion 111 of the cam track to the return portion 112, a switch plate 120 is provided with power shifting means and having an opening in the form of a notch defined by internal edges 121, 122 (FIG. 13). For moving the switch plate between two limit positions, a hydraulic or pneumatic actuator 125 is provided having a piston rod 126 and alternate inlet openings 127, 128.

In operation, the switch plate is first caused to occupy the position shown in FIG. 13 in which the internal edge 121 constitutes a continuation of the forward cam track 111. When the cam follower 100 reaches the position shown, centered between the two portions of the cam track, the idler rollers on the carriage are in substantially their neutral position and the carriage is in a stationary or "dwell" condition. Further movement of the carriage is prevented by a fixed stop 129.

However, it is one of the features of the present invention that the fixed stop is not engaged during normal cycling of the carriage and that the carriage is instead automatically positioned, at the end of the stroke, by servo action. More specifically, in carrying out the present invention, the end of the cam track is extended so that the cam follower is permitted to go beyond neutral position and so that the controlled rollers are skewed in the opposite, or braking, direction incident to slight overtravel of the carriage beyond its desired nominal end position. The slight reverse skew, after the carriage comes to a halt, then serves to automatically back up the carriage to a precise reference position for operation of the gripper. This will be made clear upon reference to the diagram in FIG. 12 where it will be noted that the decelerating portion 111c of the first cam track is extended as shown at 111d, by providing a cut-out, so taht the cam follower 100, after reaching the neutral position shown at N, can proceed additionally, with overtravel of the carriage to the position N' in which the idler rollers on the carriage are skewed in the opposite direction. Such opposite skew not only provides a dynamic braking action but also brings about automatic repositioning at the desired end point since, after the carriage is stopped, the reverse skew causes the carriage to back up to the desired final position in which the cam follower occupies the true neutral position N. The stop 129 should be offset "downstream" of the cam track sufficiently so that it is not engaged incident to slight overtravel of the carriage and so that it provides a limiting safety function.

The restoration, it will be noted, is a true example of servo action since the greater the tendancy toward overtravel the more the rollers are oppositely skewed to prevent such overtravel. As the carriage backs up the reverse skew is progressively less and finally reduced to zero when the desired reference position of carriage and cam follower is established. This insures a high degree of accuracy in the final positioning of the gripper before operation of the gripper jaws, an accuracy which is independent of the position of stops, independent of the condition of the rollers and of the friction which exists between the rollers and drive shaft, and independent of the inertia of the combined carriage and workpiece.

The switch plate 120, it will be noted, is scalloped out to correspond to the profile 111d to provide clearance for the cam follower during its condition of overtravel. Any banging of the carriage at the stops is eliminated. While the automatic positioning has been discussed in connection with the right-hand end of the cam track, it will be understood that equivalent provision is made (but not shown in detail) at the opposite or left-hand end of the cam track involving extension of the decelerating portion 112c of the track.

In order to terminate the dwell and to initiate movement of the carriage in the opposite direction, the switch plate 120 is moved by the actuator 125 to its opposite condition in which the internal edge 122 constitutes a continuation of the "return" portion 112 of the cam track. When the plate 120 is switched, the cam follower is urged a small amount off center and down the return portion of the cam track, thereby skewing the idler rollers 81–84 slightly in the "return" direction, which initiates return movement of the carriage. Once the carriage starts to move, the cam follower 100 is drawn increasingly from its neutral condition and along the curved portion of cam track 112, accelerating movement of the carriage. Following acceleration, in the return direction, the carriage moves at high speed along the straight portion 112b of the cam track. The cam follower then engages the final section 112c during which deceleration occurs, and the carriage, and its cam follower, are restored to the extreme left-hand or starting position.

For the purpose of moving the cam follower 100 from the return portion 112 of the cam track back to the forward portion to initiate a new cycle of the carriage, a second switch plate 130 is used having elements which are numbered correspondingly to the switch plate 120 and which is actuated by a pneumatic or hydraulic actuator 135. It may be noted that the switch plates, upon actuation not only serve to initiate shifting of the cam follower into the alternate track but serve to hold the cam follower captive at the end of the original track until actuation occurs, thereby to insure a desired length of dwell.

It is one of the features of the present construction that the cam track assembly 110 is not provided in a single piece but is of composite construction, consisting of relatively telescoping portions which are sandwiched together and with the cam follower 100 being of such axial length as to engage both portions of the "sandwich." Thus the assembly 110 is made up of a relatively thick left-hand end portion 141, a bridging portion 142, and a relatively thick right-hand end portion 143, the central or bridging portion 142 being in the form of relatively thin strips which are slidably secured to the underside of the portions 141, 143, being held captive thereon by means of machine screws 144 (FIG. 11). Consequently, with the screws 144 slightly loosened, the left-hand end portion 141 may be pushed inwardly to provide a relatively short stroke or pulled outwardly to provide a long stroke, thus changing the effective length of the straight portions 111b and 112b of the track.

Figure 15:
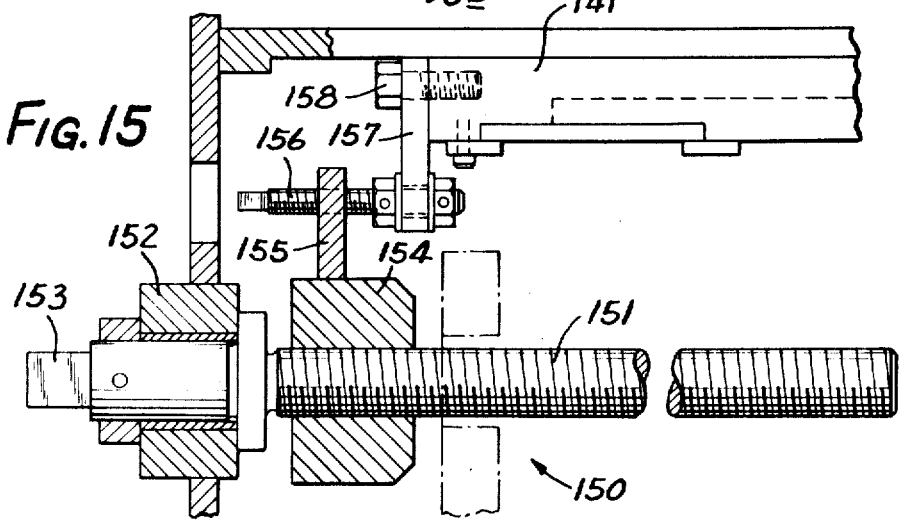
FIG. 15 is a longitudinal section taken through the left-hand end of the cam track assembly along line 15—15 in FIG. 8.

In accordance with one of the aspects of the invention means are provided for simultaneously changing the effective length of the cam track assembly and for positioning a stop in order to define the corresponding limit position of the carriage. Thus, referring to FIG. 15, the combined track and stop adjusting arrangement, indicated at 150, includes an adjusting screw 151 which is held captive at its left-hand end in a bearing 152. The screw 151 is rotatable by a tool (not shown) which may be engaged with the "square" end 153. Mounted upon the adjusting screw 151 is a traveling nut 154 which mounts a integral arm 155. Screwed into the arm is a threaded yoke 156 which is captive on a bracket 157 which is secured to the left-end portion 141 of the cam track assembly by one or more machine screws 158.

It will be apparent, then, that by rotating the adjusting screw 151 in one direction or the other, movement of the traveling nut will cause the left-hand end portion 141 of the cam track assembly to move to the right or left, thus shortening, or elongating, the cam track. Simultaneously, the repositioning of the traveling nut 154 establishes a positive limit stop which is positioned in the path of movement of the carriage and which defines its left-hand limit of movement. For the purpose of effecting a relative adjustment of the traveling stop nut 154 and the portion 141 of the cam track assembly, the threaded yoke 156 may be screwed inwardly or outwardly relative to the arm 155 in which it is received. Once this adjustment is initially made, readjustment should not be necessary.

There has been described above means for imparting longitudinal reciprocating movement to the carriage, thereby to reciprocate an arm which is secured to the underside of the carriage. This arm, indicated at 160, is mounted upon a bracket 161 which is suspended below the carriage. At its opposite end the arm has a set of grippers 162. Such grippers have been indicated only diagrammatically and will be understood to be conventional. For the purpose of imparting a vertical component of movement to the arm 160 the bracket 161 is supported upon vertical plungers 171, 172 which are received in vertically extending sleeves 173, 174 which have cylindrical anti-friction liners, for example, in the form of ball bearing sleeve assemblies. To bring about relative vertical movement between the bracket 161 and the carriage, an actuator 175 having a piston rod 176 is interposed between the two.

In a typical loading cycle, illustrated in FIG. 16, the gripper 162 grips a work piece from a cradle in which such work piece has been deposited by the conveyor or the like. The switch plate 130 at the left-hand end of the cam track assembly is actuated causing the cam follower 100 to depart from its neutral condition and to start down the curved portion 111a of the "forward" cam track. This causes the carriage to accelerate forwardly (to the right). At the same time, the actuator 175 is energized so as to lift the arm 160 so that the gripper 162 moves angularly upward along the initial portion 181 of the path illustrated in FIG. 16.

As the cam follower is moved increasingly from its neutral position, rotating the collars which move the rollers 81–84 into fully skewed condition, the carriage is, by reason of the helical walking of the rollers on the drive shaft 70, propelled along the drive shaft until deceleration occurs in the region 111c of the forward cam track. During such deceleration, the vertical actuator, 175 is pressurized in the opposite direction, causing the gripper 160 to drop from its horizontal path of movement 182 along the curved path 183 to deposit the work piece in the working area of the press. At this time, means (not shown) are provided for releasing the gripper 162. After the work piece has been released, and after a certain minimum amount of dwell, the switch plate 120 is shifted by its actuator 125 to move the cam follower 100 from its neutral position to a slightly displaced position along the return portion of the cam track, so that return acceleration occurs, accompanied by actuation of the vertical actuator 175, so that the gripper is now caused to retrace its movement along path 183, 182 to the left-hand position 181 where the gripper is decelerated and lowered for gripping the next work piece.

While the forward and reverse paths of the gripper are shown, in FIG. 16, to be coincident, coincidence is not necessary to the operation, and the path of the gripper may instead define a closed loop. Moreover, while the forward and return portions 111, 112 of the cam track are shown to be symmetrical, thereby to produce the same speed and acceleration in both the forward and return movements of the gripper, such symmetry is not necessary and the lateral displacement of the return portion of the track 112 may, if desired, have a greater amount of offset or "throw" to cause the carriage to be returned at a higher velocity and with higher levels of acceleration and deceleration, than during the forward stroke.

It will be apparent that the above construction amply fulfills the objects of the present invention. Except only for the central casting 53 of the carriage, the parts are simple and cheaply obtained. The cam track assembly 110, being used for control purposes only and hence lightly loaded, may be inexpensively fabricated of formica or the like and is readily replaceable with an assembly having a track of different contour or amount of "throw." Alternatively, the speed, and hence cycle time, may be changed by varying the effective radius of the cam follower or by changing the speed of motor 76 which rotates the drive shaft.

While it is true that the drive is impositive, this constitutes a safety factor, yet permits generation of adequate drive forces to handle heavy work pieces. Indeed, the unbalanced weight of the arm 160 and the work piece which it carries, producing a moment of the carriage bodily about a horizontal axis, results in a pinching action of the first and fourth rollers against the shaft so that the maximum driving force tends to vary with the weight of the work piece being handled.

It is found that while nylon plastic, with which the rollers are surfaced, is not normally considered to be a frictional material, nevertheless such material combines the benefits of adequate friction, cushioning, abrasion resistance, and a long useful life. Polyurethane and asbestos brake shoe materials are alternate choices. If desired the surfacing may be used on the drive shaft instead of on the rollers.

While the invention has been described in connection with a loader for a press, it will be understood that the invention is not necessarily limited thereto and that the term "loader" shall be understood to include analogous functions in any machine requiring the reciprocating action. Also while the term "horizontal" has been employed, it will be understood that this is a relative term and that the device could, if desired, be oriented as to provide vertical reciprocation, particularly where suitable means (not shown) are provided for counterbalancing the weight of the carriage. The term "arm" is a general one not limited to any particular configuration. The term "resilient" as applied to the frictional surfacing material does not imply softness, and hard materials which have the capability of yielding even slightly to secure "area" rather than "line" contact with the rollers in skewed position shall be understood to come within the scope of this term.

What I claim is:

1. In a reciprocating loading device for loading and unloading a power press or the like, the combination comprising a frame, a horizontal drive shaft journaled in the frame and having means for rotating the same, way surfaces on the frame extending parallel to the drive shaft, a reciprocating carriage embracing the shaft and mounted for movement along the way surfaces, means providing a cam track on the frame extending parallel to the path of movement of the carriage, an arm on the carriage, a set of frictionally surfaced idler rollers for frictionally engaging the drive shaft, said rollers being journaled in the carriage for rotation about axes lying in planes substantially parallel to the axis of the drive shaft, means for mounting the roller shafts in the carriage for skewing movement in their respective planes, and linkage for simultaneously skewing the roller shafts in one of two opposite directions from a neutral position in which the roller shafts are parallel to the drive shaft, the linkage including a cam follower coupled to the cam track, the cam track being so formed that the roller shafts are moved to a first skewed position in which the carriage is propelled along the shaft in one direction and a second oppositely skewed position in which the carriage is subsequently propelled along the drive shaft in the opposite direction.

2. In a reciprocating loading device for loading and unloading a power press or the like, the combination comprising a frame, a horizontal drive shaft journaled in the frame and having means for rotating the same, way surfaces on the frame extending parallel to the drive shaft, a reciprocating carriage embracing the shaft and mounted for movement along the way surfaces, cam track means on the frame extending parallel to the path of movement of the carriage, an arm on the carriage, a set of frictionally surfaced idler rollers for frictionally engaging the drive shaft, said rollers being journaled in the carriage for rotation about axes lying in planes substantially parallel to the axis of the drive shaft, means for mounting the roller shafts in the carriage for skewing movement in their respective planes, linkage including a cam follower for engaging the cam track means and coupled to the roller shafts for skewing them in opposite directions from a neutral position in which the roller shafts are parallel to the drive shaft, said cam track means including a forward cam track for skewing the rollers to a first position for advancing the carriage along the shaft in one direction and a return cam track for skewing the rollers in the opposite direction for return movement of the carriage, and means at the ends of the cam track means for switching the cam follower from one cam track to the other.

3. The combination as claimed in claim 2 in which the switching means at the ends of the cam tracks include means for receiving the cam follower and guiding it from the end of one of the tracks into the initial portion of the opposite track thereby to initiate skewing of the idler rollers in the opposite direction for movement of the carriage in the opposite direction.

4. The combination as claimed in claim 3 in which the switching members at the ends of the cam track means have respective power actuators.

5. The combination as claimed in claim 2 in which the switching means includes means for holding the cam follower captive at the end of a track until intentionally released thereby to provide a defined period of dwell.

6. The combination as claimed in claim 2 in which the two cam tracks are spaced parallel to one another but converge mutually endwardly at the end portions thereof to form a closed loop.

7. The combination as claimed in claim 6 in which each switching means includes a flat plate having a notch for receiving the cam follower at the ends of its movement together with means for reciprocating the plate.

8. The combination as claimed in claim 2 in which the central portions of the cam tracks are parallel to one another and in which means are provided for changing the effective length of the parallel portions thereby to vary the length of stroke of the carriage.

9. The combination as claimed in claim 8 in which the cam track means is formed in overlapping longitudinally slidable sections for changing the effective length of the cam tracks.

10. In a reciprocating loading device for loading and unloading a power press or the like, the combination comprising a frame, a horizontal drive shaft journaled in the frame and having means for rotating the same, way surfaces on the frame extending parallel to the drive shaft, a reciprocating carriage embracing the shaft and mounted for movement along the way surfaces, an arm on the carriage, a set of frictionally surfaced idler rollers for frictionally engaging the drive shaft, said rollers being journaled in the carriage for rotation about axes lying in planes substantially parallel to the axis of the drive shaft, means for mounting the roller shafts in the carriage for skewing movement in their respective planes, cam track means extending parallel to the path of movement of the carriage, linkage means including a cam follower engaging the cam track means for skewed positioning of the roller shafts, the cam track means providing a track in the form of an endless loop having parallel side portions, stop means for limiting the range of movement of the carriage, said cam track means having provision for varying the length of the side portions and for correspondingly positioning the stop means.

11. In a reciprocating loading device for loading and unloading a power press or the like, the combination comprising a frame, a horizontal drive shaft journaled in the frame and having means for rotating the same, way surfaces on the frame extending parallel to the drive shaft, a reciprocating carriage embracing the shaft and mounted for movement along the way surfaces, a set of frictionally surfaced idler rollers for frictionally engaging the drive shaft on opposite sides, said rollers being journaled in the carriage for rotation about shafts lying in planes substantially parallel to the axis of the drive shaft, means for mounting the roller shafts in the carriage for skewing movement from a neutral position in their respective planes, means for skewing the roller shafts from the neutral position in a direction which depends upon the desired direction of movement of the carriage and in an amount which depends upon the desired speed, said skewing means being in the form of a cam track having generally parallel portions lying in the respective sides of a neutral position and having a cam follower controllingly connected to the roller shafts, the cam track being in the form of an elongated closed loop pointed at its ends, the ends of the track including means for reversing the direction of skew when the carriage moves beyond a desired reference limit position and which is effective, upon overtravel, to drive the carriage back to the reference limit position.

12. In a reciprocating loading device for loading and unloading a power press or the like, the combination comprising a frame, a horizontal drive shaft journaled in the frame and having means for rotating the same, way surfaces on the frame extending parallel to the drive shaft, a reciprocating carriage embracing the shaft and mounted for movement along the way surfaces, an arm on the carriage, a set of frictionally surfaced idler rollers for frictionally engaging the drive shaft, said rollers being journaled in the carriage for rotation about axes lying in planes substantially parallel to the axis of the drive shaft, means for mounting the roller shafts in the carriage for skewing movement in their respective planes, cam track means extending parallel to the path of movement of the carriage, linkage means including a cam follower engaging the cam track means for skewed positioning of the roller shafts, the cam track means providing a track having a longitudinal portion offset from a neutral cam follower position and an end portion which converges inwardly to neutral position, the end portion of the track being slightly extended to provide a slight amount of offset in the opposite direction so that, upon overtravel of the carriage beyond a corresponding reference position, the roller shafts are skewed in the opposite direction to cause the carriage to back up to, and come to rest at, its reference position.

13. The combination as claimed in claim 12 in which the cam track means is in the form of an elongated endless loop made up of a forward track and a reverse track and in which each track has a reference position at its end corresponding to a neutral cam follower position and in which each track is extended at its end to offset the cam follower in the opposite direction so that the carriage, upon overtravel, is restored to reference position.

* * * * *